(12) United States Patent
Otter

(10) Patent No.: US 6,994,822 B2
(45) Date of Patent: Feb. 7, 2006

(54) METHOD FOR IMPROVING INSULATION IN HOLLOW METAL VOLUMES

(75) Inventor: James W. Otter, Fairfield Glade, TN (US)

(73) Assignee: Carrier Corporation, Farmington, CT (US)

( * ) Notice: Subject to any disclaimer, the term of this patent is extended or adjusted under 35 U.S.C. 154(b) by 453 days.

(21) Appl. No.: 10/222,389

(22) Filed: Aug. 16, 2002

(65) Prior Publication Data

US 2004/0031801 A1 Feb. 19, 2004

(51) Int. Cl.
*B29C 49/24* (2006.01)

(52) U.S. Cl. .................................... 264/516

(58) Field of Classification Search ................ 264/516

See application file for complete search history.

(56) References Cited

U.S. PATENT DOCUMENTS

| | | | | | |
|---|---|---|---|---|---|
| 3,477,506 | A | * | 11/1969 | Malone | 166/207 |
| 3,827,130 | A | * | 8/1974 | Baumann | 29/421.1 |
| 4,901,676 | A | * | 2/1990 | Nelson | 122/19.2 |
| 4,974,551 | A | * | 12/1990 | Nelson | 122/19.2 |

* cited by examiner

*Primary Examiner*—Suzanne E. McDowell
(74) *Attorney, Agent, or Firm*—Wall Marjama & Bilinski LLP

(57) ABSTRACT

A non-planar wall of a refrigerated container is thermally insulated by covering the wall with an air tight liner, drawing a vacuum on the internal volume of the liner and then sealing the compartment to maintain the vacuum. The liner is installed by first constructing a thermoplastic liner with a portion which approximates the non-planar shape of the wall, and then pressurizing the liner and applying heat thereto so as to cause it to thereby partially liquify, and expand into any openings that would otherwise cause leakage and to thereby adhere to the metal and form a monolithic air tight structure.

6 Claims, 2 Drawing Sheets

US 6,994,822 B2

METHOD FOR IMPROVING INSULATION IN HOLLOW METAL VOLUMES

BACKGROUND OF THE INVENTION

This invention relates generally to methods and materials for sealing a compartment and, more particularly, a method of thermally insulating a wall surface of a refrigerated container.

A refrigerated container is a portable enclosure having a self-contained refrigeration unit connected thereto and having a space within the enclosure for the storage of refrigerated goods. The goods may be frozen, in which case the container must be kept at below freezing temperatures, or it may be simply refrigerated goods, in which case the container must still be maintained at a relatively low temperature as compared to the surrounding ambient temperatures. In either case, in order to maintain the lower temperatures within the enclosure, it is desirable to insulate the container.

Where the container walls are planar in form, which is the case for most walls, it is relatively simple to provide a planar shape of insulating material over the entire planar surface of the wall. However, when it is non-planar form such as at the forward end wherein various components of the refrigeration system are disposed, it is difficult to use the planar sheets of insulation since they can not be easily bent around the non-planar surface, nor can they be easily made to adhere to those planar surfaces.

The common approach for insulating the non-planar portions of a refrigerated container is to install a spaced wall so as to thereby define an envelope or pod adjacent the non-planar wall. The envelope is then filled with liquid urethane foam which, when dried, provides sufficient insulation to that portion of the container.

There are various problems connected with the use of urethane foam in this manner. One problem is that the liquid urethane contains volatile organic contaminants (VOC's) that have a tendency to escape to the atmosphere and which are harmful thereto. With increasingly stricter regulations relating to this matter, greater efforts are being made to eliminate the use of liquid urethanes in the manufacturing processes.

Another problem with the prior art approach is that, prior to the insulation of the liquid urethane, it is necessary to seal all of the various openings in the envelope in order to prevent the liquid urethane from flowing outside the container. Generally this is accomplished by using a sealant such as caulk, to seal the various seams within the envelope. This practice is effective but very labor intensive. Also, the cost of materials for this practice can be relatively high.

It is therefore an object of the present invention to provide an improved method and apparatus for insulating a refrigerated container.

Another object of the present invention is the provision in a refrigerated container for effectively and easily insulating a non-planar portion of a wall thereof.

Yet another object of the present invention is the provision for insulating a refrigerated container without the use of undesirable and expensive materials.

Still another object of the present invention is a process for insulating a refrigerated container in an effective and an efficient manner.

These objects and features and advantages become more readily apparent upon reference to the following description when taken in conjunction with the appended drawings.

SUMMARY OF THE INVENTION

Briefly, in accordance with one aspect of the invention, a space to be insulated is formed on one side by a non-planar surface. In order to prevent leakage at the non-planar surface a hollow liner made of thermo-plastic film is installed within the space with a portion thereof having its shape roughly approximating the shape of the non-planar surface of the space. The assembly is then heated to the point where the thermoplastic film becomes viscous, at which time a pressurized fluid is imposed on the inner side of the hollow liner such that the viscous resin is forced outwardly against the walls of the space to thereby seal any openings therein. Once the resin is cooled and hardened, a vacuum is drawn on the liner and the liner is sealed in order to maintain the vacuum therein and to thereby present a space that serves well as an insulator.

In accordance with another aspect of the invention, the pressure/temperature/time relationship that is maintained during the process of first lowering the viscosity of the resin and then raising it, are such that the resin is caused to closely adhere to the metal sides of the space and to thereby become an integral part thereof.

By yet another aspect of the invention, the liner is composed of a polymeric material and may be formed in a single piece by blow molding or it may be a plurality of pieces that are interconnected by way of a thermoforming process.

In the drawings as hereinafter described, a preferred embodiment is depicted; however various other modifications and alternate constructions can be made thereto without departing from the true spirt and scope of the invention.

DESCRIPTION OF THE PREFERRED EMBODIMENT

Figure 1:
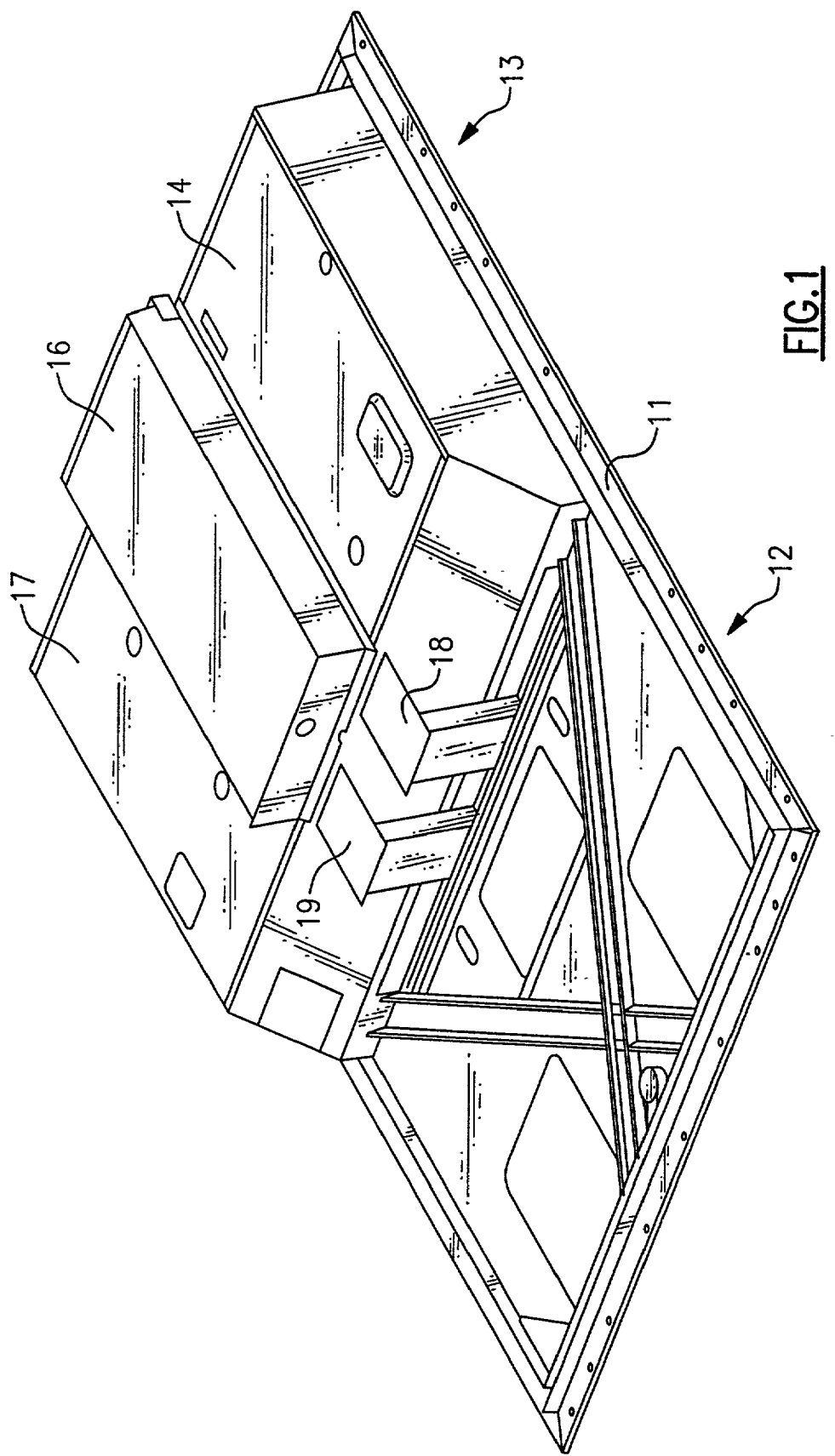
FIG. 1 is a perspective view of the front wall portion of a refrigerated container to which the present invention relates.

Referring now to FIG. 1, there is shown a front wall 11 of a self-contained refrigeration unit which is to be maintained at relatively cool temperatures by way of a standard refrigeration system including a motor driven compressor and various control system components. A lower portion 12 provides support for the compressor and the gas or diesel engine for driving the compressor, while an upper portion 13 includes a plurality of box like structures 14–19 which are intended to contain various gauges and control components such as temperature indicators, temperature recorder, and the like. As will be seen, these box like structures are assembled together such that, collectively, they present a non-planar face to which it is generally difficult to apply insulation. Insulation is required in order to isolate the box like structures 14–19, with their heat producing electronic components, from the refrigerated container box on the one side thereof. Further, along the interface lines, wherein the various box like structures are interconnected, there is a likelihood that holes or openings will exist such that the structural integrity is not secure and leakage will therefore occur.

The present invention is intended to provide an insulative envelope around the non-planar surfaces defined by the box like structures 14–19. It should be recognized that, although it is being described as applicable to a wall within a refrigerated container, it may as well be used for any application wherein a non-planar wall requires insulation. For example, in the heating, ventilation, air conditioning and refrigeration industries, it may be applied to transportable refrigeration systems for refrigerated trucks or trailers, refrigerated rail cars or compartments on board ships, or applied to air conditioning systems on buses or trains or stationary structures. In this regard, the structure of FIG. 2 is intended to generally show a non-planar surface which requires an insulative material or structure to be applied thereto.

Figure 2:
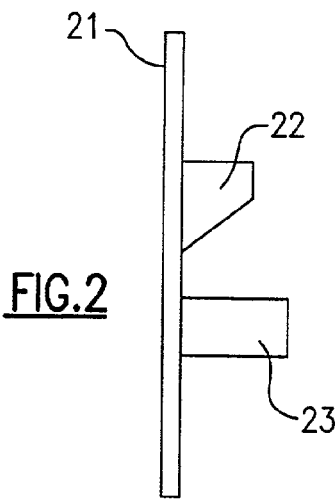
FIG. 2 is a schematic illustration of a generalized version thereof.

FIG. 2 therefore shows a wall 21 having non-uniform shaped abutments 22 and 23 attached to one side thereof. On the right side of the wall 21 the temperatures are generally at one level, and on the left side thereof they are at another level. While the specific application described above would require the temperature on the right side of the wall 21 to be maintained at a relatively constant cool temperature and the temperature on the left to be generally variable and at a higher temperature, it should be understood, in accordance with the present invention, the cooler temperatures may exist on the left side rather then the right side of the wall 21.

Figure 3:
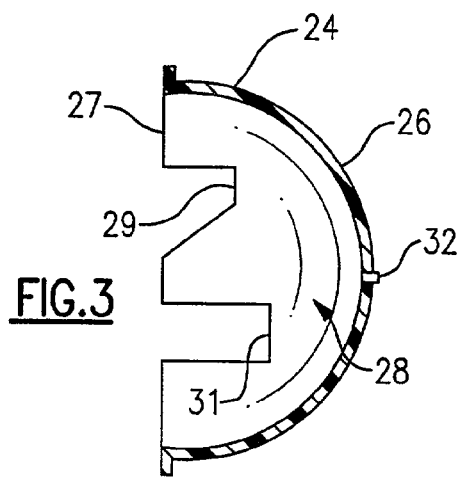
FIG. 3 is a schematic illustration of a hollow shell or liner to be applied in accordance with a preferred embodiment of the invention.

Referring now to FIG. 3, there is shown a hollow shell or liner 24 having a hemispherical portion 26 and a irregular or non-planar shaped portion 27, collectively defining a cavity 28 therein. The non-planar portion 27 includes portions 29 and 31 which are formed to approximate the shape of the respective abutments 22 and 23 of the wall 21.

The shell 24 is preferably composed of a flexible material whose viscosity can be varied to a desirable degree by exposure to higher temperatures. Generally, a polymeric film is preferred, and, in particular, a commercially available material that can be used for this purpose is Aurum Polyimide which is available from Toyo Kohan Company Ltd. The shell 24 may be fabricated in a single integral unit by way of blowmolding Alternatively, it may be made from a plurality of parts (e.g. the two portions 26 and 27 may be independently fabricated) such as by die cutting or the like, with the respective pieces then being interconnected by way of a thermoforming process. A port 32 is provided in the hemispherical portion 26 in order to pressurize and evacuate the cavity 28 as part of the insulation process.

Figure 4:
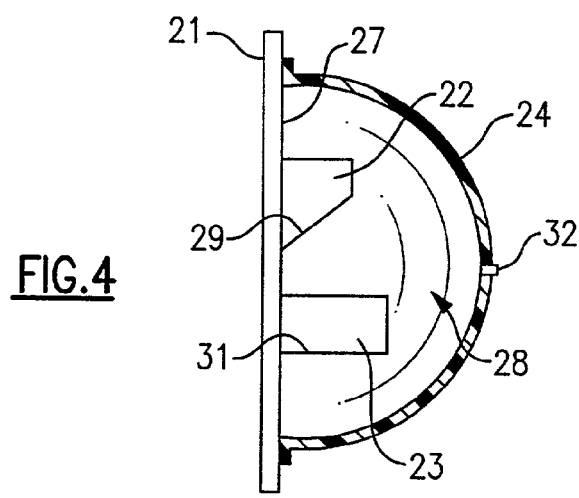
FIG. 4 is a schematic illustration of the shell as applied to the non-planar surface in accordance with a preferred embodiment of the invention.
Figure 5:
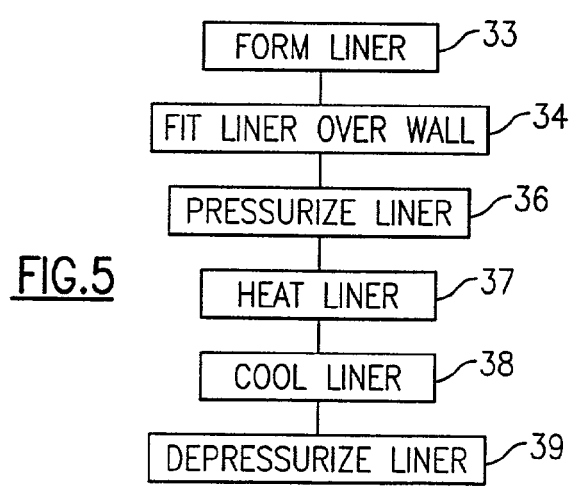
FIG. 5 is a flow chart illustrating the process in accordance with a preferred embodiment of the invention.

Referring now to FIG. 4, the shell 24 is shown as placed over the wall 21 with its abutments 22 and 23, with the abutment 22 being in substantial registry with the portion 29 and the abutment 23 being in substantial registry with the portion 31 as shown. The application process is then shown in FIG. 5 to include the steps 33 and 34 wherein the liner is formed and then placed over the wall. Next, the shell 24 is pressurized by way of the port 32. In this step, the cavity 28 is pressurized for example to a level, in the range of 0.1 to 10 psig, and then port 32 is closed. During this process, a fixture is preferably used to hold the shell 24 against the wall 21 such that the non-planar portion 27 of the shell 24 is closely held against the wall 21 and its abutments 22 and 23.

The liner is then heated as shown in step 37, such that its viscosity decreases to the point that it is caused to flow under the pressure in the cavity 28. For example, with the Aurum Polyimide material as described above, the material would be heated to a temperature in the range of 600° F. to 800° F. As the polymeric film softens with the higher temperatures, it flows into any holes that exist in the non-planar portion 27 and is caused by the pressure to adhere to the metal of the wall 27. A monolithic, air tight structure then results.

The next step it to cool the liner as shown in block 38 until the polymer no longer flows. During the cooling process the pressure is maintained. Once the combination is cooled and the polymer has fully solidified, the pressure is released as shown in block 39. The port 32 is then plugged, resulting in a dead air space in the cavity 28 which provides for the desired insulation between the wall 21 and the surrounding refrigerated space on the other side of the shell 24. If desired, a vacuum may be taken on the cavity 28 to enhance the insulation properties of the shell 24.

Though the present invention has been described in terms of a preferred embodiment, it would be readily apparent that other modifications and variations can be made while remaining within the sprit and scope of the invention.

I claim:

1. A method of thermally insulating a hollow metal structure having a plurality of wall surfaces that are interconnected in such a manner as to be susceptible to leakage therebetween, comprising the steps of:

forming a hollow liner composed of a thermoplastic material, said liner having wall shapes corresponding to those of the wall surfaces of the hollow metal structure;

placing said hollow liner over the hollow metal structure with its wall shapes being in substantial registry with the corresponding wall surfaces of the hollow metal structure;

pressurizing said hollow liner so as to cause it to expand outwardly against the wall surface of the hollow metal structure;

heating said hollow liner so as to cause it to partially liquify and flow more closely against, and adhere to, the wall surfaces of the hollow metal structure;

allowing said hollow liner to cool so as to thereby increase its viscosity and;

depressurizing said hollow liner and sealing it to create a dead air space therein.

2. A method as set forth in claim 1 wherein said thermoplastic material is a polymeric film.

3. A method as set forth in claim 1 wherein said hollow liner is formed in a single piece.

4. A method as set forth in claim 3 wherein said hollow liner is formed by a blow molding process.

5. A method as set forth in claim 1 wherein said hollow liner is formed in at least two pieces and further wherein said at least two pieces are interconnected by a thermoforming process.

6. A method as set forth in claim 1 and including the further step of drawing a vacuum on said hollow liner prior to sealing it.

* * * * *